United States Patent [19]

Harnish et al.

[11] Patent Number: 5,061,577

[45] Date of Patent: Oct. 29, 1991

[54] MAGNETIC COATING COMPOSITIONS CONTAINING FLUOROPOLYOLS

[75] Inventors: Daniel F. Harnish, Morristown; Donald Pickens, Mendham; Richard J. Brautigam, Westfield, all of N.J.

[73] Assignee: Allied-Signal Inc., Morristown, N.J.

[21] Appl. No.: 277,089

[22] Filed: Nov. 28, 1988

[51] Int. Cl.$^5$ ............................................. G11B 23/00
[52] U.S. Cl. ..................................... 428/694; 428/695; 428/900; 528/401; 528/402
[58] Field of Search ................. 428/694, 900; 528/401, 528/402

[56] References Cited

U.S. PATENT DOCUMENTS

| | | | |
|---|---|---|---|
| 3,247,017 | 4/1966 | Eichler et al. | 117/138.8 |
| 3,720,639 | 3/1973 | Griffith | 260/33.4 EP |
| 3,778,308 | 12/1973 | Roller et al. | 117/234 |
| 3,852,222 | 12/1974 | Field et al. | 260/2 EP |
| 3,879,430 | 4/1975 | O'Rear et al. | 260/348 R |
| 4,132,681 | 1/1979 | Field et al. | 260/836 |
| 4,284,747 | 8/1981 | Griffith et al. | 525/530 |
| 4,526,836 | 7/1985 | Mukai et al. | 428/421 |
| 4,696,845 | 9/1987 | Yanagisawa | 428/64 |
| 4,699,969 | 10/1987 | Re et al. | 528/70 |
| 4,722,859 | 2/1988 | Kudo et al. | 428/216 |

FOREIGN PATENT DOCUMENTS 0319919 6/1988 European Pat. Off. .

OTHER PUBLICATIONS

Perry et al., "Magnetic Tape", Kirk-Othmer Encyclopedia of Chemical Technology 14, 732–753 (1981).
International Search Report dated Nov. 17, 1989.
International Search Report PCT/US89/05094.

Primary Examiner—Merrell C. Cashion, Jr.
Assistant Examiner—Steven A. Resan
Attorney, Agent, or Firm—Roger H. Criss

[57] ABSTRACT

A class of fluorinated polyols which when added to formulated dispersions used to make a magnetic particle based coating not only improves the dispersion of the particles in the formulation during manufacture but also improves the wear characteristics of the cured coating during use. The fluorinated polyol may be prepared either by the reaction of a diglycidyl ether with a diol or by the reaction of two diols with epichlorohydrin.

15 Claims, No Drawings ized in the prior art. For examples of other members of this class of starting polyols, see U.S. Pat. Nos. 3,480,463; 3,810,874 and 3,923,926.

MAGNETIC COATING COMPOSITIONS CONTAINING FLUOROPOLYOLS

BACKGROUND OF THE INVENTION

1. Field of the Invention

This invention relates to improved magnetic coating compositions and magnetic recording media produced with such compositions, as well as certain novel fluoropolyols.

2. Description of the Prior Art

Audio, video, computer, and other magnetic recording tapes and disks are subject to extensive wear during use. During both recording and playback the magnetic medium is in frictional contact with the read/write head resulting in abrasion of its surface with concomitant loss of signal, read/write head wear, and even audible squeal. Because of such wear the lubrication of magnetic media used in tape, disk, and other applications has played an important part in their development (See R. H. Perry and A. A. Nishimura, Kirk-Othmer: Encyclopedia of Chemical Technology 14, 732-753 (1981)).

A magnetic recording tape or disk consists of a magnetic coating on a flexible or rigid (hard disk) nonmetallic substrate. Historically, these coatings have been made from a suspension of magnetic particles dispersed in an organic binder. More recently, magnetic films produced by direct sputtering of magnetic materials on the substrate have been developed. The present invention relates primarily to magnetic coatings based on pigment dispersion.

Basic manufacture of a magnetic particle based system involves the coating on the substrate of choice with a formulated product containing pigment, organic binder, solvent, dispersants, lubricants, conductivity aids, and other miscellaneous additives. Dispersants are used to deagglomerate the magnetic particles and to provide for their maximum possible separation while maintaining maximum pigment-to-binder volume ratio. Magnetic tape performance is critically dependent on the nature of this dispersion and its volume ratio. Numerous dispersion agents have been used, such as lecithin, organic esters of phosphoric acid, organic acids, quaternary ammonium compounds, organic amines and miscellaneous surfactants. Of these, the more successful have been soya lecithin and synthetic phosphate esters. Lubricants are used to reduce the head-to-tape frictional interaction. Earlier versions and much of the current productions of magnetic tape involve the use of rather well known lubricants: fatty acids and esters, glyceryl esters, fatty acid amides, silicones, hydrocarbons and other refined oils. The selection of lubricant is not necessarily easy. The ideal lubricant must not only be compatible with the formulated coating solution during manufacture, but after cure and dry, must also migrate to the head-tape interface at the proper rate to provide lubricity yet not exude excessively to cause build-up on the head. The more common lubricants used include: isocetylstearate, butoxyethyl stearate, butylmyristate, silicone oils, and synthetic sperm oil.

More recently, various fluorinated materials have been shown to be excellent high-performance lubricants. In particular perfluoroalkyl polyethers have been used on both magnetic pigment/binder and on sputtered magnetic film recording tapes. Because of incompatibilities with other components of the formulated magnetic coatings used for pigment/binder tape manufacture, the fluorinated materials are generally applied as a coating to the previously manufactured tape. This post-treatment represents a costly and unwanted step in the manufacturing process (see U.S. Pat. No. 3,778,308).

The usual perfluorinated fluid or oil is essentially a non-polar material and, as such, has little tendency to bind itself or stick to the magnetic coating surface. When used as a lubricant film on the magnetic coating surface these materials are easily removed and therefore do not provide long term protection for the tape. Because of this, considerable effort has been expended to develop fluorinated materials with associated polar groups (see U.S. Pat. No. 4,696,845). The presence of these polar groups causes the fluorinated fluid to be strongly bound to the magnetic coating surface and to provide longer term protection to the tape. In some cases the non-polar fluorinated fluid can be used in conjunction with a second coating material which enhances its binding to the surface. In this latter case, a second, undesirable, post-treatment step in the manufacturing process is required (see U.S. Pat. No. 4,722,859).

It would be desirable to provide a class of fluorinated materials which overcomes the problems discussed above yet provides long term wear for magnetic coated tape. It would also be desirable to provide a class of fluorinated materials which is an excellent dispersant for the magnetic pigments used and therefore enhances the overall performance of the tape.

Certain fluoropolyols are known in the art. See, for example, U.S. Pat. Nos. 3,720,639; 3,852,222 and 4,284,747. It would be desirable to provide other, novel fluoropolyols which are useful, in particular, in magnetic coating compositions.

SUMMARY OF THE INVENTION

In accordance with this invention, there is provided a magnetic coating composition comprising a suspension of magnetic pigments in an organic binder, said organic binder comprising a fluoropolyol of the structure:

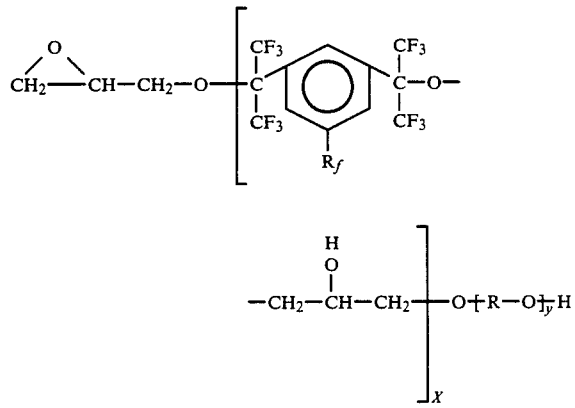

where $X+Y=2-16$, $X\neq 0$ and where $R_f=C_nF_{2n+1}$ for $n=0-18$ and where R is selected from the group consisting of aliphatic radicals, aromatic radicals, cycloaliphatic radicals and fluorinated radicals. Preferably, R is:

(a) an aliphatic radical such as
—$(CH_2)_n$— for $n=2-8$
or —$(CH_2CHXO)_n$— for $n=1-3$ and X=H or $CH_3$, or (b) an aromatic radical such as derived from resorcinol, or bisphenol A, or (c) a cycloaliphatic radical such as derived from cyclohexanediol or cyclohexanedimethanol or (d) a fluorinated radical such as
—CH$_2$(CF$_2$)$_3$—CH$_2$—
or —CH$_2$—CH$_2$(CF$_2$—CF$_2$)$_n$CH$_2$CH$_2$— for n=1–4

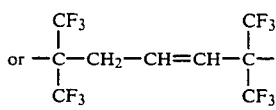

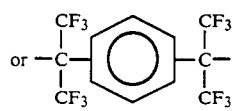

It has been found that when the above polymeric fluoropolyols are added to conventional formulations of raw materials used to manufacture particle/binder based magnetic recording tape; they (1) form stable, compatible material compositions with no phase separation of solution components;

(2) aid in the dispersion of magnetic pigments in the formulated composition during blending and in the subsequent cured/dried magnetic coating produced by this formulation, thereby improving coating performance; and (3) provide for a low energy, low friction, surface on the cured/dried magnetic coating, thereby improving its useful lifetime yet not requiring a post-treatment to obtain this improvement.

Also in accordance with this invention there is provided a magnetic recording medium comprised of the magnetic coating of this invention coated onto either a flexible or rigid substrate.

Further in accordance with this invention, there is provided a fluoropolyol having the structure

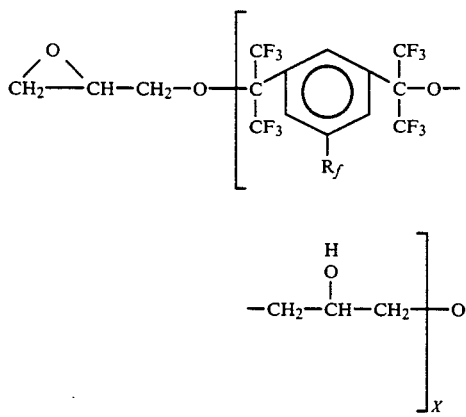

where X+Y=2–16, and X≠0 and where R$_f$=C$_n$F$_{2n+1}$ for n=1–18, and where R is selected from the group consisting of aliphatic radicals, aromatic radicals, cycloaliphatic radicals and fluorinated radicals selected from the group consisting of:
—CH$_2$(CF$_2$)$_n$—CH$_2$— for n=3–7,
—CH$_2$—CH$_2$(CF$_2$—CF$_2$)$_n$CH$_2$CH$_2$— for n=1–4 and

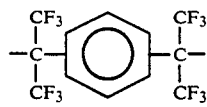

It has been found that these polymeric fluoropolyols are especially useful as additives for magnetic compositions.

DESCRIPTION OF THE PREFERRED EMBODIMENTS

An ideal wear additive for magnetic pigment based formulations may be described, in part, as a material which on direct blending in the formulation forms a homogeneous, single phase mixture with the other solution components. During the curing process this ideal wear additive will concentrate on the surface of the dried magnetic coating and will be bound there in a more-or-less permanent state and will provide a low friction surface against the read/write head, thereby protecting the total system for a long period of time. The ideal additive is effective at low concentrations and will not interfere with the coating of the formulation on the selected substrate nor will it interfere with the magnetic performance of cured/dried magnetic coating. The fluoropolyols of the present invention are such ideal wear additives. When blended in magnetic pigment based formulations, they form homogeneous solutions with other solution components, they do not interfere with the coating process, they concentrate and are bound on the surface of the cured/dried coating, and they cause the formation of a low friction surface.

An ideal dispersion aid for magnetic pigment based formulations may be described, in part, as a material which aids in the deagglomeration of the magnetic particles which are held together by magnetic attractions, reduces the time required to mill or blend the formulation, thereby avoiding undesirable reduction in magnetic pigment size, and helps maintain a maximum distance between particles in the cured/dried coating, thereby improving magnetic performance. The dispersion aid should not interfere with the coating process and should not interfere with the performance of the wear additive or lubricant used in the formulation. The fluoropolyols of the present invention are such an ideal dispersion aid. When blended in magnetic pigment based formulations, they reduce required mill times to achieve proper formulation dispersion, and they improve the magnetic performance of the magnetic coating.

As will be seen, it has been found that the fluoropolyols of the present invention are, simultaneously, in fact, both an ideal wear additive and an ideal dispersion aid for magnetic pigment based magnetic coating media.

It has been found that the polymeric fluoropolyols of the structure indicated below possess characteristics of both a conventional polyol and a conventional fluoropolymer. As with most polyols the hydroxyl groups of the fluoropolyol are reactive and may be crosslinked with various types of agents, such as multifunctional isocyanates, to form resinous materials, such as urethane resins. Some of the properties of these resins are similar to those of the non-fluorinated resin while some are more related to the properties of a fluororesin. For instance, the chemical and thermal stability of the urethane resins appear to be dependent on the presence of the urethane linkage, and thus the stability of the fluorourethane produced from these fluoropolyol appears to be of the same order as that for non-fluorinated urethanes. The fluorourethanes, however, posses many of the properties of a fluoropolymer: low moisture absorption, low moisture permeation, low dielectric constant, low index of refraction, and low surface energy.

The fluoropolyols have the structure:

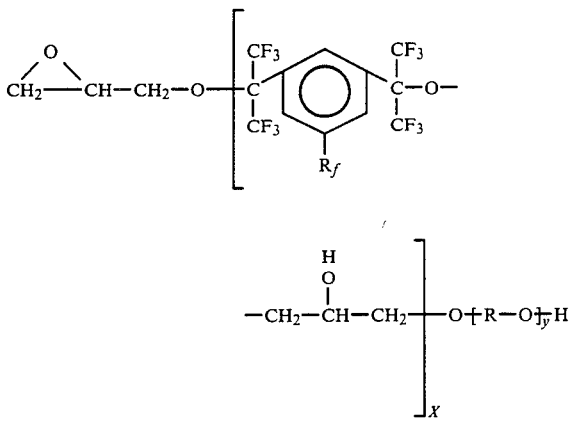

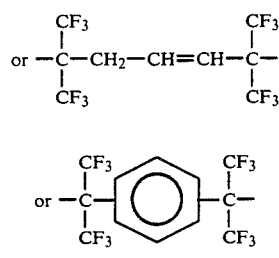

where $X+Y=2-16$, $X \neq 0$ and where $R_f = C_nF_{2n+1}$ for $n=0-18$ and where R is:

(a) an aliphatic radical such as

—$(CH_2)_n$— for $n=2-8$ or —$(CH_2CHXO)_n$— for $n=1-3$ and $X=H$ or $CH_3$ or (b) an aromatic radical such as derived from resorcinol, or bisphenol A or (c) a cycloaliphatic radical such as derived from cyclohexanediol or cyclohexanedimethanol or (d) a fluorinated radical, preferably a fluorinated aliphatic, aromatic or cycloaliphatic radical, such as

—$CH_2(CF_2)_3$—$CH_2$— or —$CH_2$—$CH_2(CF_2$—$CF_2)_n CH_2 CH_2$— for $n=1-4$

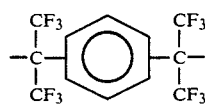

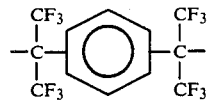

The fluorinated polyols may be prepared either by the reaction of a diglycidyl ether with a diol (see U.S. Pat. No. 3,720,639 to Griffith) or by the reaction of the two diols with epichlorohydrin (see U.S. Pat. No. 3,852,222 to Field et al.).

The novel fluoropolyols of this invention have the structure:

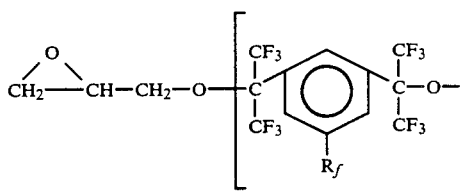

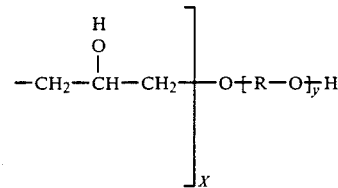

where $X+Y=2-16$, and $X \neq 0$ and where $R_f = C_nF_{2n+1}$ for $n=1-18$, and where R is selected from the group consisting of aliphatic radicals, aromatic radicals, cyclocaliphatic radicals and fluorinated radicals selected from the group consisting of:

—$CH_2(CF_2)_n$—$CH_2$— for $n=3-7$,

—$CH_2$—$CH_2(CF_2$—$CF_2)_n CH_2 CH_2$— for $n=1-4$ and

In the above structures, preferably X is 2 to 5 and Y is 2 to 5. Preferably, the aliphatic radicals have from 1 to 8 carbon atoms, the cycloaliphatic radicals have from 6 to 8 carbon atoms and the aromatic radicals have from 6 to 15 carbon atoms. Also preferably in the fluorinated radical —$CH_2(CF_2)_n$—$CH_2$, $n=3$.

The aliphatic radicals are more preferably selected from the group of —$(CH_2)_n$— for $n=2-8$ or —$(CH_2CHXO)_n$— for $n=1-3$ and $X=H$ or $CH_3$; the aromatic radicals are more preferably selected from radicals derived from resorcinol or bisphenol A; and the cycloaliphatic radicals are more preferably selected from radicals derived from cyclohexanediol or cyclohexanedimethanol.

In the most preferred fluoropolyols, $R_f$ is $C_8F_{17}$ or $C_6F_{13}$ and R is either —$CH_2(CF_2)_3$—$CH_2$—, —$(CH_2)_4$—, a radical derived from bisphenol A, or There are many well-known possible combinations of materials which may be used to formulate a particle based magnetic coating. As previously discussed, the basic formulated product used to cast a magnetic coating consists of a magnetic pigment, an organic binder, a conductivity agent, a dispersant, a lubricant, and a solvent. Magnetic pigments which have been used include oxides such as $\gamma$-$Fe_2O_3$, Co-containing $\gamma$-$Fe_2O_3$, surface doped Co-$\gamma$-$Fe_2O_3$, $Fe_3O_4$, Co-containing $Fe_3O_4$, $CrO_2$ and Ba $(FeO_2)_2$ or powders of magnetic metals such as Fe, Co, Ni, etc. Although various thermoplastic materials have been used as the organic binder, it is more common in recent times to use thermoset materials. These include: polyurethanes, polyesters, epoxies and phenoxies, cellulose nitrate, polyimides, polyvinylacetal, polyvinylbutyral, polycarbonates, polysulfones, phenol-formaldehyde resins, melamine-formaldehyde resins, polyacrylic esters, polyacrylic acid, and a variety of vinylchloride, vinylidene dichloride, and butadiene copolymers, and the like. Polyester urethanes are particularly important because of their superior mechanical properties.

Conductivity agents are included in the formula to reduce the electrical resistance of the magnetic coating and to prevent static charge build-up. In general, one of numerous possible carbon blacks may be used for such purpose. As discussed above, a variety of materials may be used as dispersants including soya lecithin and various synthetic phosphate esters. Solvents are used to dissolve the binder resins and additives and to provide a fluid medium for the magnetic pigment dispersion. Common solvents employed include: tetrahydrofuran, cyclohexanone, methyl ethyl ketone, methyl isobutyl ketone, and toluene.

In the present invention all practical combinations of the above materials may be used. When a fluoropolyol of the invention is used in these combinations, it aids in the dispersion of the pigment in the formulated product and imparts a low friction surface and reduced wear characteristics to the cured/dried magnetic coating. In essence it becomes part of the binder system and is bound at the surface of the magnetic coating. A variety of cross-linking agents may be used. Among the preferred ones is an aromatic polyisocyanate adduct based on toluene diisocyanate. In the presence of selected cross-linking agents the fluoropolyol is bound within and on the binder resin selected. The only criterion which the formulated product should meet is that the solution phase of the formulated materials, including the crosslinking agent if used, must form a homogeneous, single phase system. In some cases the fluoropolyol may be prereacted in the system to achieve this condition.

When a fluoropolyol of the present invention is blended with most practical combinations of binder resins, a primary dispersant, and a solvent, it forms a homogeneous, non-separating system. When magnetic powders and conductivity aids are added to this blend and the resulting system is mixed and milled, the particles are rapidly dispersed and upon coating and curing form a film with optimal magnetic properties. The surface of this film possess a low coefficient of friction.

It has been found that when the fluoropolyol is removed from the blend such that dispersion depends only on the primary dispersant, the milling time of the resultant formulation must be increased about 30 to 50% to achieve a similar level of magnetic performance. In addition, if the fluoropolyol is replaced in the blend with a conventional migrating lubricant, the coefficient of dynamic friction increases by about 5 to 30% and the wear characteristic of the system under practical use conditions is significantly impacted in an adverse way.

The fluoropolyols of the present invention are considered as both wear additives and dispersion aids for magnetic pigment based coating systems. The fluoropolyols are typically present in the magnetic coating in an amount from about 0.5 to 20 weight percent based on the weight of the total binder system, and preferably about 1 to 12 weight percent. The other components may be present in their conventional amounts. The magnetic coating may be coated onto a flexible or rigid substrate (such as a tape of floppy disk) in any conventional manner.

The following non-limiting examples are given to further understand the present invention.

Examples 1 and 2 demonstrate the two basic methods for preparing the fluoropolyols of this invention.

EXAMPLE 1

To a 2 liter, 3 neck flask equipped with a water cooled condenser, a stirrer, a heating mantle and nitrogen purge tube were added 331 grams of Compound 1 (identified below—$C_8$Diol), 164 grams of Compound 2 (identified below) and 500 ml of methylisobutyl ketone (MIBK). While stirring and heating this mixture to reflux, 81.4 grams of epichlorohydrin and 80 grams of 50% sodium hydroxide were slowly added. After reflux for 30 hours the mixture was cooled, washed four times with water, and dried by azeotropic distillation of water with MIBK. The resulting polyol had a number average molecular weight of 4400 and a hydroxyl content of 1.5 meq/g.

EXAMPLE 2

To a 12 liter, 3 neck flasked equipped with a water cooled condenser, a stirrer, a heating mantle and nitrogen purge tube were added 1880 grams of the diglycidyl ether of Compound 1 ($C_8$DGE), 820 grams of Compound 2, 2000 ml of MIBK, 8 g of benzyltriethylammonium chloride, and 0.1 grams of potassium hydroxide. With stirring this mixture was heated to a maximum temperature of 110° C. for 50 hours, cooled, washed four times with water, and dried by azeotropic distillation of water with MIBK. The resulting polyol had a number average molecular weight of 6600 and a hydroxyl content of 1.45 meq/g.

Compounds 1 and 2 above refer to the following structures:

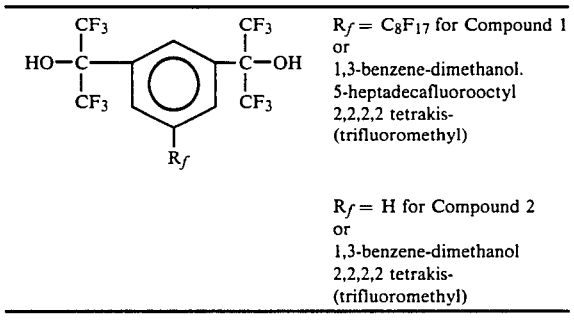

$R_f = C_8F_{17}$ for Compound 1
or
1,3-benzene-dimethanol.
5-heptadecafluorooctyl
2,2,2,2 tetrakis-
(trifluoromethyl)

$R_f = H$ for Compound 2
or
1,3-benzene-dimethanol
2,2,2,2 tetrakis-
(trifluoromethyl)

EXAMPLES 3–9

In Examples 3–9 the benefits of using the fluoropolyol of Example 2 in a simplified version of a magnetic coating composition is demonstrated and compared with those obtained using a common migrating lubricant, isocetylstearate. In these examples samples were prepared in laboratory jar mills and were milled according to a test protocol (two days for Phase 1 components and three days for Phase 2) which has been found to simulate milling levels achieved in production sandmill equipment. Samples were hand coated onto 1 mil Mylar polyester film for testing purposes. When used, the crosslinking agent was added just prior to coating. Examples 3 and 4 are comparative examples where no fluoropolyol was used. The results are shown in Table 1. The coated films were tested for magnetic and durability properties. The results are indicated below.

TABLE 1

| EXAMPLE NO. | 3 | 4 | 5 | 6 | 7 | 8 | 9 |
|---|---|---|---|---|---|---|---|
| COMPOSITION (Parts By Wt.) | | | | | | | |
| PHASE 1 | | | | | | | |
| PIGMENT (1) | 10 | 10 | 10 | 10 | 10 | 10 | 10 |
| DISPERSANT (2) | .3 | .3 | .3 | .3 | .3 | .3 | .3 |
| FLUOROPOLYOL | — | — | .1 | .2 | .25 | .2 | .25 |
| URETHANE (3) | .3 | .3 | .3 | .3 | .3 | .3 | .3 |
| MEK (4) | 50 | 50 | 50 | 50 | 50 | 50 | 50 |
| ICS (5) | — | .3 | — | — | — | — | — |
| PHASE 2 | | | | | | | |
| URETHANE (3) | 2.7 | 2.7 | 2.6 | 2.5 | 2.45 | 2.2 | 2.05 |
| MEK | 50 | 50 | 50 | 50 | 50 | 50 | 50 |
| CROSSLINK (6) | — | — | — | — | — | .3 | .4 |
| PERFORMANCE | | | | | | | |
| SQUARENESS ($B_r/B_m$) (7) | .79 | .82 | .83 | .86 | .86 | .85 | .86 |
| STEINBERG DURABILITY @ 8m/sec–50 gm (min) | 1 | 2 | 2 | 8 | 12 | 22 | 28 |
| SCRATCH RESISTANCE (gm) (9) | 250 | 250 | 300 | 400 | 400 | 500 | 500 |
| COEFFICIENT OF FRICTION (10) | .384 | .307 | .286 | .284 | .286 | .291 | .291 |

(1) —$Fe_2O_3$
(2) RE610, a phosphate ester from GAF Chemicals Corporation
(3) Estane ® 5715, a thermoplastic polyurethane from B. F. Goodrich
(4) Methylethyl ketone solvent
(5) Isocetylstearate
(6) Mondur ® CB75, a difunctional isocyanate which is an aromatic polyisocyanate adduct based on toluene diisocyanate from Mobay Chemical
(7) The ratio of remanence to saturation magnetization ($B_r/B_m$) as measured on a magnetic hysteresis loop.
(8) Durability as measured on a Model MDT 3000 Media Durability Tester from Steinberg Associates. This machine simulates wear of the magnetic media in still frame mode on a video cassette player. It determines time to failure in minutes as a function of tension (in grams) and head speed (meter/second).
(9) As measured by a weighted stylus
(10) As measured by an inclined plane.

The larger squareness ratio of the magnetic coatings produced by samples containing fluoropolyol (Examples 5–9) compared with those that did not (Examples 3 and 4) is indicative of a greater degree of magnetic pigment dispersion in these compositions. This greater dispersivity is further indicated by a high gloss produced by the fluoropolyol containing materials. In the absence of crosslinking agent (Examples 5–7) the presence of the fluoropolyol greatly enhances the Steinberg Durability and scratch resistance of the coatings as compared with the isocetylstearate containing product (Example 4). Similarly, the coefficient of friction for the fluoropolyol composition is lower. The presence of crosslinking agent (Examples 8 and 9), which acts both to crosslink the binder resin and react the fluoropolyol into the total binder system, further toughens the system and increases its overall durability. The fluorine atom content on the surface of the fluoropolyol containing coatings was 35% as measured by X-ray Photoelectron Spectroscopy (ESCA).

EXAMPLES 10–16

In Examples 10–16 the benefit of using fluorinated polyols compared with a non-fluorinated material of similar structure is demonstrated. Polyols for these examples were prepared as in Examples 1 and 2 (except as noted below) and have the following general structures:

$$CH_2\text{—}CH\text{—}CH_2\text{—}O\ [R_1\text{—}O\text{—}CH_2\text{—}CH\text{—}CH_2]_x O\text{—}[R_2O]_y H$$

(with epoxide O on left CH₂–CH and OH on the CH)

Specific structures include:

| Example No. | $R_1$ | $R_2$ |
|---|---|---|
| 10 | $R_3$ | $R_4$ |
| 11 | $R_3$ | —$CH_2(CF_2)_3CH_2$— |
| 12 | $R_3$ | —$(CH_2)_4$— |

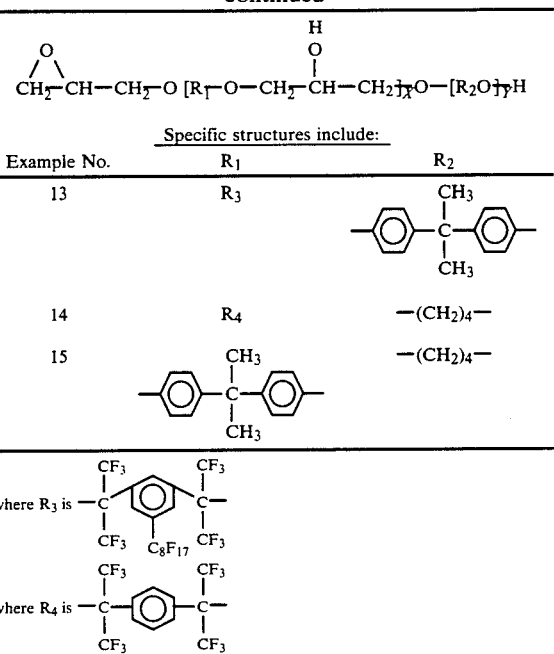

For the polyol of Example 11, $C_8$DGE/Hexafluoropentanediol (HFPD), the procedure of Example 2 was followed except that the mixture was heated for 40 hours. The resulting polyol had a number average molecular weight of 2800 and a hydroxyl content of 1.80 meq/g.

For the polyol of Example 12, $C_8$DGE/Butanediol (BD), the procedure of Example 2 was modified in that the charge was as follows: 1880 g of $C_8$DGE (2.00 mols), 180 g of BD diol (2.00 mols), 2000 ml of MIBK and 1.0 ml of $BF_3$ etherate catalyst. This mixture was heated at 90°–100° C. for 7 hours until 95% of the reactants disappeared as determined by gas chromatography. The resulting polyol had a number average molecular weight of 2100 and a hydroxyl content of 2.2 meq/g.

For the polyol of Example 13, $C_8$Diol/Bisphenol A (BPA), the procedure of Example 1 was followed, except that the charge was as follows: 83 g of $C_8$Diol (0.1 mol), 20 g BPA (0.1) mol), 20.4 g epichlorohydrin (0.22 mol) and 19 g sodium hydroxide (0.24 mol), and 100 ml MIBK. The mixture was heated at reflux (93°-96° C.) for 6 hours. The resulting polyol had a number average molecular weight of 2600.

For the polyols of Examples 14 and 15, the procedure of Example 2 was followed.

Formulations were prepared as above except that a vinyl co-binder was included in the Phase 1 mixture to further toughen the system. Performance evaluations were conducted as before. Examples 15 and 16 are comparative examples. The results are shown in Table 2.

replicate a typical commercial system. The fluoropolyol of Example 2 was used and the compositions are indicated below in Table 3.

TABLE 3

|  | EXAMPLE 17 | EXAMPLE 18 |
|---|---|---|
| PHASE 1[(1)] | | |
| PIGMENT | 100 | 100 |
| DISPERSANT | 3 | 3 |
| FLUOROPOLYOL | 2.5 | — |
| VITEL 200 | 4.0 | 4.0 |
| VAGH (2) | 2.0 | 2.0 |
| METHYLETHYL KETONE | 200 | 200 |
| ISOCETYLSTEARATE | — | 3.0 |
| PHASE 2[(1)] | | |
| URETHANE (3) | 21.5 | 21.5 |
| MEK | 200 | 200 |
| CROSSLINK | 1.5 | 1.5 |

[(1)]As above except as noted.
[(2)]A vinyl copolymer from Union Carbide Corp.
[(3)]Estane ® 5740 × 719 from B. F. Goodrich.

TABLE 2

| EXAMPLE NO. | 10 | 11 | 12 | 13 | 14 | 15 | 16 |
|---|---|---|---|---|---|---|---|
| | COMPOSITION (Parts By Wt.) | | | | | | |
| PHASE 1[(1)] | | | | | | | |
| PIGMENT | 10 | 10 | 10 | 10 | 10 | 10 | 10 |
| DISPERSANT | .3 | .3 | .3 | .3 | .3 | .3 | .3 |
| POLYOL | .25 | .25 | .25 | .25 | .25 | .25 | 0 |
| CO-BINDER[(2)] | .6 | .6 | .6 | .6 | .6 | .6 | .6 |
| MEK | 50 | 50 | 50 | 50 | 50 | 50 | 50 |
| PHASE 2[(1)] | | | | | | | |
| URETHANE | 2.15 | 2.15 | 2.15 | 2.15 | 2.15 | 2.15 | 2.15 |
| MEK | 50 | 50 | 50 | 50 | 50 | 50 | 50 |
| CROSSLINK | .18 | .18 | .18 | .18 | .18 | .18 | .18 |
| PERFORMANCE[(1)] | | | | | | | |
| SQUARENESS ($B_r/B_m$) | .87 | .83 | .83 | .86 | .82 | .85 | .85 |
| STEINBERG DURABILITY | | | | | | | |
| @ 8m/sec–50 gm (min) | 30 | 30 | 30 | 30 | 30 | 21 | 12 |
| SCRATCH RESISTANCE (gm) | 500 | 500 | 500 | 500 | 450 | 300 | 150 |
| FRICTION | .28 | .28 | .28 | .28 | .28 | .32 | .36 |

[(1)]As above except as noted
[(2)]Vitel 200, an ester co-polymer from Goodyear

The high fluorine content provided by the fluorinated polyols of Examples 10–14 causes them to segregate at the surface and through reactions with the crosslinking agent to produce a bound low energy fluorourethane film on the magnetic coating. In the absence of fluorine in the polyol (Example 15) no segregation occurs and wear performance approaches that for a formulation with no lubricant at all (Example 16). A polyol of low fluorine content (Example 14) also appears capable of segregation and provides intermediate performance between that of polyols of higher fluorine content and those with no fluorine at all.

EXAMPLES 17 AND 18

The ability of the fluoropolyols to enhance the dispersion of magnetic pigments is further demonstrated in Examples 17 and 18 with Example 18 being a comparative example. In these examples it is seen that the amount of milling time required to achieve maximal magnetic performance is significantly less in the presence of the fluoropolyol. Two co-binders, VAGH and VITEL 200, were included in the overall formulation in order to further enhance performance and more closely Using the above compositions, the formulations were prepared by adding in order Phase 1 solvent, dispersant, binders, fluoropolyol or ICS, and pigment to a 10 gallon tank and mixing with a high speed Cowles Dissolver for 30 min. This pre-mix was transferred to a 1.5 liter horizontal, glass bead (1.2 mm) mill operated at a 0.5 liter/min pump rate with a shaft speed of 10 M/sec. using an 87% chamber charge. After each pass of Phase 1 dispersion through the mill at 50° C., a hand coat on Mylar film was prepared and physical and magnetic properties measured. After completion of the fourth pass of Phase 1 components, the Phase 2 binder and solvent were added as a solution to the Phase 1 dispersion and the resulting mixture blended for 30 min in a Cowles Dissolver. This combined mixture was milled three times under the same conditions as Phase 1, and after each pass a hand coating on Mylar film was prepared and properties measured. For these latter three samples a crosslinking agent was added prior to coating the formulation. The results of physical and magnetic property measurements are as indicated in Table 4.

TABLE 4

|  | SQUARENESS | HC(1) (Oe) | FRICTION | STEINBERG @8M/SEC-50GM MIN |
|---|---|---|---|---|
| EXAMPLE 17 | | | | |
| PHASE 1 PASS 1 | .62 | 640 | — | — |

TABLE 4-continued

|  |  | SQUARENESS | HC(1) (Oe) | FRICTION | STEINBERG @8M/SEC-50GM MIN |
|---|---|---|---|---|---|
|  | 2 | .79 | 648 | — | — |
|  | 3 | .86 | 650 | — | — |
|  | 4 | .86 | 650 | — | — |
| PHASE 2 PASS | 1 | .83 | 651 | .286 | 30 |
|  | 2 | .86 | 650 | .274 | 30 |
|  | 3 | .86 | 650 | .274 | 30 |
| EXAMPLE 18 |  |  |  |  |  |
| PHASE 1 PASS | 1 | .51 | 637 | — | — |
|  | 2 | .68 | 647 | — | — |
|  | 3 | .76 | 649 | — | — |
|  | 4 | .80 | 651 | — | — |
| PHASE 2 PASS | 1 | .74 | 645 | .319 | 16 |
|  | 2 | .79 | 649 | .312 | 18 |
|  | 3 | .81 | 650 | .307 | 26 |

(1)Magnetic coercivity

The sample containing fluoropolyol (Example 17) not only produces the larger squarness ratio, it achieves both its maximal magnetic properties values with fewer numbers of passes through the mill. Both squareness ($B_r/B_m$) and coercivity are directly related (other parameters being equal) to the degree of pigment dispersion in the coating. The ability of the fluoropolyol to aid in pigment dispersion is significant and can reduce overall milling costs in manufacturing formulated magnetic pigment products.

EXAMPLES 19 AND 20

In order to additionally demonstrate the benefits of the fluoropolyols of the present invention, a complete magnetic pigment formulation was prepared and used to make 5.25 inch floppy diskettes (Example 19). The performance of these disks was compared directly to those made from an identical formulated product containing isocetylstearate (Example 20) and to three commercially available disk products. The fluoropolyol of Example 2 was used and the formulation used for this demonstration is as indicated in Table 5:

TABLE 5

|  | EXAMPLE 19 | EXAMPLE 20 |
|---|---|---|
| PHASE 1(1) |  |  |
| PIGMENT | 100 | 100 |
| DISPERSANT | 3 | 3 |
| CONDUCTIVITY AID(2) | 3 | 3 |
| ALUMINA(3) | 2 | 2 |
| FLUOROPOLYOL | 2.5 | — |
| VITEL 200 | 4 | 4 |

TABLE 5-continued

|  | EXAMPLE 19 | EXAMPLE 20 |
|---|---|---|
| VAGH | 2 | 2 |
| ISOCETYLSTEARATE | — | 3 |
| METHYLETHYL KETONE | 200 | 200 |
| PHASE 2(1) |  |  |
| URETHANE | 21.5 | 21.5 |
| MEK | 200 | 200 |
| CROSSLINK | 1.5 | 1.5 |

(1)As above, except as noted.
(2)Pearl 2000, a carbon black from Cabot.
(3)E140, an alumina abrasive from Norton.

Both formulations were mixed as described for Examples 17 and 18 and were milled in the same glass bead mill. Phase 1 components were milled 3 times and the combined Phase 1/Phase 2 mixture was passed an additional 2 times through the mill. The completely dispersed mixtures were filtered for 8 hours through a 3 micron filter, the crosslinking agent was added, and the formulas were coated on Mylar film and cured using automated equipment employing a Gravure coating head and a three zone furnace (130°–180° C.) operated at 400 ft/min.

The coating was calandered using a Perkins model with 7 rolls employing a soft cotton roll with pressure of 1000 pounds per linear inch (PLI) at 180° F. and was also operated at 400 ft/min. A total of 500 disks of both formulas was made and jacketed using a Kendall 9007 rayon polyester liner. As before, the finished coated product containing fluoropolyol had a high gloss and slippery feel as compared to the isocetylstearate containing coating. The results are indicated in Table 6:

TABLE 6

| SAMPLE |  | EXAMPLE 19 | EXAMPLE 20 | COMMERCIAL PRODUCT A | B | C |
|---|---|---|---|---|---|---|
| 1) PHYSICAL PERFORMANCE |  |  |  |  |  |  |
| SCRATCH (gm) |  | 500 | 450 | 500 | 500 | 500 |
| FRICTION |  | .186 | .241 | .241 | .194 | .241 |
| TORQUE-STARTING(1) |  | .48 | .79 | .55 | .56 | .58 |
| (inch. oz) | RUNNING | .14 | .39 | .16 | .17 | .12 |
|  | PAD LOADING | 2.01 | 3.10 | 2.61 | 2.54 | 2.80 |
| STEINBERG (Min) |  |  |  |  |  |  |
| 8M/SEC | 20 GM | 30 | 30 | ND(5) | 30 | ND |
|  | 50 GM | 30 | 26 | ND | 30 | ND |
|  | 100 GM | 30 | 20 | ND | 30 | ND |
| 13M/SEC | 20 GM | 30 | 22 | 30 | 30 | 30 |
|  | 50 GM | 28 | 16 | 20 | 21 | 20 |
|  | 100 GM | 18 | 1 | 15 | 16 | 18 |
| OUT OF JACKET WEAR (Min)(2) |  |  |  |  |  |  |
| 1000 RPM | 50 GM | 240 | 190 | 240 | 240 | 240 |

TABLE 6-continued

| SAMPLE | | EXAMPLE 19 | EXAMPLE 20 | COMMERCIAL PRODUCT | | |
|---|---|---|---|---|---|---|
| | | | | A | B | C |
| | 100 GM | 80 | 40 | 80 | 60 | 80 |
| | 500 GM | 30 | 10 | 20 | 20 | 20 |
| 2) MAGNETIC PERFORMANCE | | | | | | |
| COERCIVITY (Oe) | | 650 | 650 | ND | 620 | ND |
| SQUARENESS[3] | | .51 | .50 | ND | .53 | ND |
| SFD[4] | | .39 | .46 | ND | .41 | ND |

[1] Operating torque as measured on a commercial disk drive.
[2] Wear measured by determining the length of time in minutes until the output of a recorded signal on a single track is 70% lost while the read head is subjected to the specified force.
[3] The magnetic pigments in a floppy disk product are not oriented. The theoretical squareness for such a coating is 0.50.
[4] Switching field distribution-a value for this parameter ( > .4) indicates poor pigment distribution.
[5] Not determined.

Inspection of this data indicates that the floppy disks made with the fluoropolyol (Example 19) is clearly superior to that made with isocetylstearate (Example 20). Where data is available the performance of the Example 19 products is also either equivalent or superior to all three commercially sold disks.

It can be seen that the present invention provides a magnetic coating composition which provides coated products having excellent long term wear and other physical and magnetic properties. The fluoropolyols of this invention are excellent dispersants for the magnetic pigments used in such coating compositions.

We claim:

1. A magnetic coating composition comprising a suspension of magnetic pigments in an organic binder, said organic binder comprising from about 0.5 to about 20 weight percent, based on the weight of the total binder system, of a fluoropolyol of the structure:

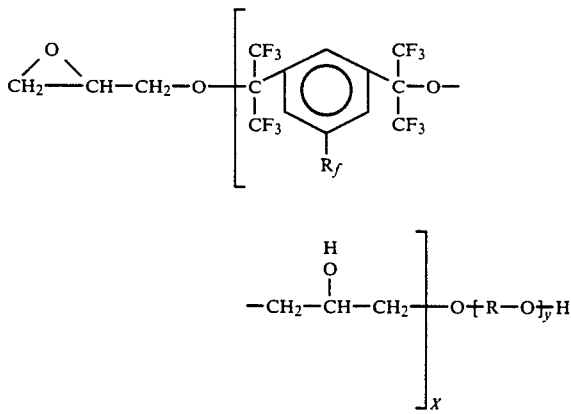

where $X+Y=2-16$, $X\neq 0$ and where $R_f=C_nF_{2n+1}$ for $n=0-18$ and where R is selected from the group consisting of aliphatic radicals, aromatic radicals, cycloaliphatic radicals, and fluorinated radicals, wherein when said magnetic coating composition is dried or cured, the fluoropolyol is concentrated on and chemically bound on the surface of the coating.

2. A magnetic coating composition according to claim 1, wherein said fluoropolyol comprises from about 1 to about 12 weight percent based on the weight of the total binder system.

3. A magnetic coating composition according to claim 1, wherein said aliphatic radical is selected from radicals of the formula
—$(CH_2)_n$— for n-2-8, and
—$(CH_2CHXO)_n$— for n-1-3 and X=H or $CH_3$;

said aromatic radical is selected from radicals derived from resorcinol or bisphenol A; said cycloaliphatic radical is selected from radicals derived from cyclohexanediol or cyclohexanedimethanol; and said fluorinated radical is selected from radicals of the formula of:
—$CH_2(CF_2)_3$—$CH_2$—,
or —$CH_2$—$CH_2(CF_2$—$CF_2)_n$ $CH_2CH_2$— for n=1-4,

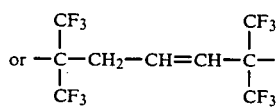

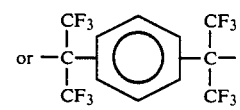

4. A magnetic coating according to claim 1 wherein $R_f$ is $C_8F_{17}$ or $C_6F_{13}$.

5. A magnetic coating according to claim 4 wherein X is 2 to 5 and Y is 2 to 5.

6. A magnetic coating according to claim 4 wherein $R_f=C_8F_{17}$.

7. A magnetic coating according to claim 1 further comprising a crosslinking agent.

8. A magnetic coating according to claim 7 wherein said crosslinking agent is an aromatic or aliphatic polyisocyanate.

9. A magnetic coating according to claim 8 wherein said polyisocyanate is an aromatic polyisocyanate adduct based on toluene diisocyanate.

10. A magnetic recording medium comprised of the magnetic coating of claim 1 coated on either a flexible or rigid substrate.

11. A magnetic recording medium comprised of the magnetic coating of claim 4 coated on either a flexible or rigid substrate.

12. A magnetic recording medium comprised of the magnetic coating of claim 6 coated on either a flexible or rigid substrate.

13. A magnetic recording medium comprised of the magnetic coating of claim 8 coated on a flexible or rigid substrate.

14. A magnetic recording medium according to claim 13 wherein said polyisocyanate is an aromatic polyisocyanate adduct based on toluene diisocyanate.

15. A magnetic recording medium comprised of a magnetic coating composition coated on either a flexible or rigid substrate and then dried or cured, said composition comprising a suspension of magnetic pigments in an organic binder, said organic binder comprising from about 0.5 to about 20 weight percent, based on the weight of the total binder system, of a fluoropolyol of the structure:
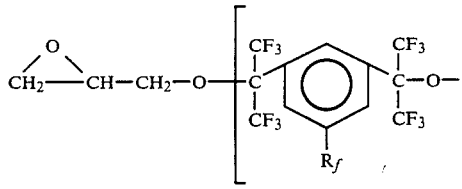
-continued
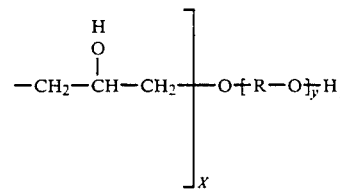
where $X+Y=2-16$, $X \neq 0$ and wherein said fluoropolyol is concentrated on and chemically bound on the surface of the coating.
* * * * *